United States Patent
McGregor

(10) Patent No.: US 10,750,725 B2
(45) Date of Patent: Aug. 25, 2020

(54) STORAGE SYSTEM FOR CHICKEN FEEDERS

(71) Applicant: Southwest Agri-Plastics, Inc., Addison, TX (US)

(72) Inventor: Michael A. McGregor, Lewisville, TX (US)

(73) Assignee: Southwest Agri-Plastics, Inc., Dallas, TX (US)

( * ) Notice: Subject to any disclaimer, the term of this patent is extended or adjusted under 35 U.S.C. 154(b) by 350 days.

(21) Appl. No.: 15/456,293

(22) Filed: Mar. 10, 2017

(65) Prior Publication Data
US 2017/0181410 A1 Jun. 29, 2017

Related U.S. Application Data

(63) Continuation of application No. 14/512,164, filed on Oct. 10, 2014, now Pat. No. 9,591,833.

(51) Int. Cl.
  *A01K 1/10* (2006.01)
  *A01K 39/01* (2006.01)
  *A01K 39/012* (2006.01)

(52) U.S. Cl.
  CPC .......... *A01K 39/01* (2013.01); *A01K 39/0125* (2013.01)

(58) Field of Classification Search
  CPC . E04C 5/16; E04C 5/162; E04C 5/168; A47H 1/02; A47H 1/10; A47H 1/14; A47G 25/0692; E04B 1/2612; A01K 39/01; A01K 39/012; A01K 39/0125
  See application file for complete search history.

(56) References Cited

U.S. PATENT DOCUMENTS

| | | | |
|---|---|---|---|
| 3,788,025 A * | 1/1974 | Holmes | E04C 5/168 52/685 |
| 3,827,405 A | 8/1974 | Allen | |
| 5,097,797 A * | 3/1992 | Van Zee | A01K 39/0125 119/57.4 |
| 6,779,488 B2 * | 8/2004 | Corti | A01K 39/0125 119/52.4 |
| D500,665 S * | 1/2005 | Sorkin | D8/354 |
| 6,837,017 B2 * | 1/2005 | Hardy, Jr. | E01C 11/18 404/136 |
| 7,322,158 B1 * | 1/2008 | Sorkin | E04C 5/167 52/649.8 |
| D567,634 S * | 4/2008 | Sorkin | D8/354 |
| 7,461,491 B1 * | 12/2008 | Sorkin | E04C 5/168 52/679 |
| 7,497,059 B2 * | 3/2009 | Bennett | E04C 5/08 52/649.8 |
| 7,506,482 B2 * | 3/2009 | Sorkin | E04C 5/20 52/685 |
| 7,669,381 B1 * | 3/2010 | Sorkin | E04C 5/168 52/685 |

(Continued)

*Primary Examiner* — Kristen C Hayes
(74) *Attorney, Agent, or Firm* — Foley & Lardner LLP

(57) ABSTRACT

A feeder storage apparatus for a chicken feeder includes a body section, a coupling member and/or a mounting web substructure, and a feeder contacting section. The mounting web substructure is positioned on a first end of the body section for securing the body section to the coupling member and/or a chicken feed tube. The feeder contacting section is positioned on a second end of the body section and includes angled arms to support a feeder above the feed tube.

8 Claims, 17 Drawing Sheets

(56) References Cited

U.S. PATENT DOCUMENTS

| | | | |
|---|---|---|---|
| 7,753,001 B2* | 7/2010 | Hung | A01K 39/01 |
| | | | 119/61.3 |
| 8,302,917 B2* | 11/2012 | Springer | F16M 11/045 |
| | | | 248/122.1 |
| 8,500,110 B2* | 8/2013 | Allen | E04F 11/1851 |
| | | | 269/297 |
| 9,266,304 B2* | 2/2016 | Fink | B29C 70/68 |
| 9,328,863 B2* | 5/2016 | Allen | E04F 11/1851 |
| 9,591,833 B1* | 3/2017 | McGregor | A01K 39/0125 |
| 2003/0056730 A1 | 3/2003 | Corti et al. | |
| 2004/0025796 A1 | 2/2004 | Cole et al. | |
| 2004/0031228 A1* | 2/2004 | Hardy, Jr. | E01C 11/18 |
| | | | 52/687 |
| 2005/0072365 A1 | 4/2005 | Busses | |
| 2005/0102951 A1* | 5/2005 | Bennett | E04C 5/08 |
| | | | 52/633 |
| 2007/0051318 A1 | 3/2007 | Cole et al. | |
| 2009/0114160 A1* | 5/2009 | Hung | A01K 39/01 |
| | | | 119/61.3 |
| 2010/0225040 A1* | 9/2010 | Allen | E04F 11/1851 |
| | | | 269/297 |
| 2015/0252870 A1* | 9/2015 | Kashihara | F16M 13/02 |
| | | | 248/634 |
| 2016/0073615 A1 | 3/2016 | Van Kerrebroeck | |
| 2016/0095300 A1* | 4/2016 | Steudler, Jr. | A01K 39/01 |
| | | | 119/51.01 |

\* cited by examiner

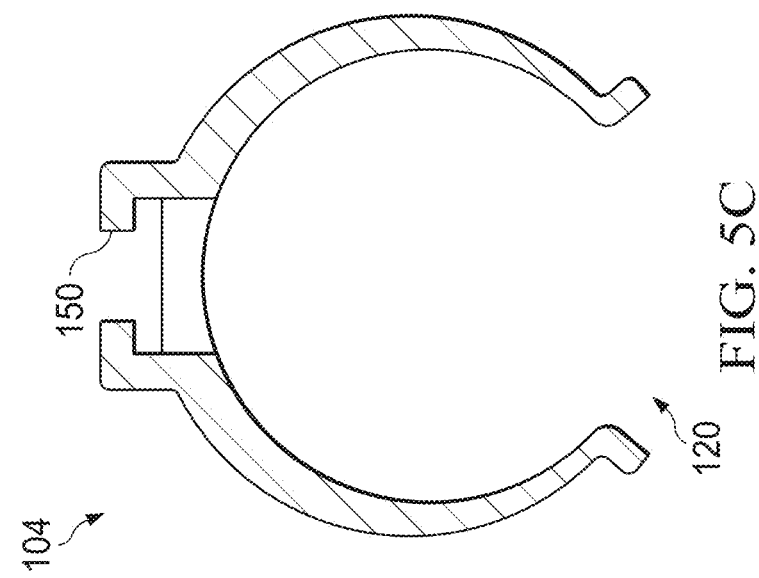
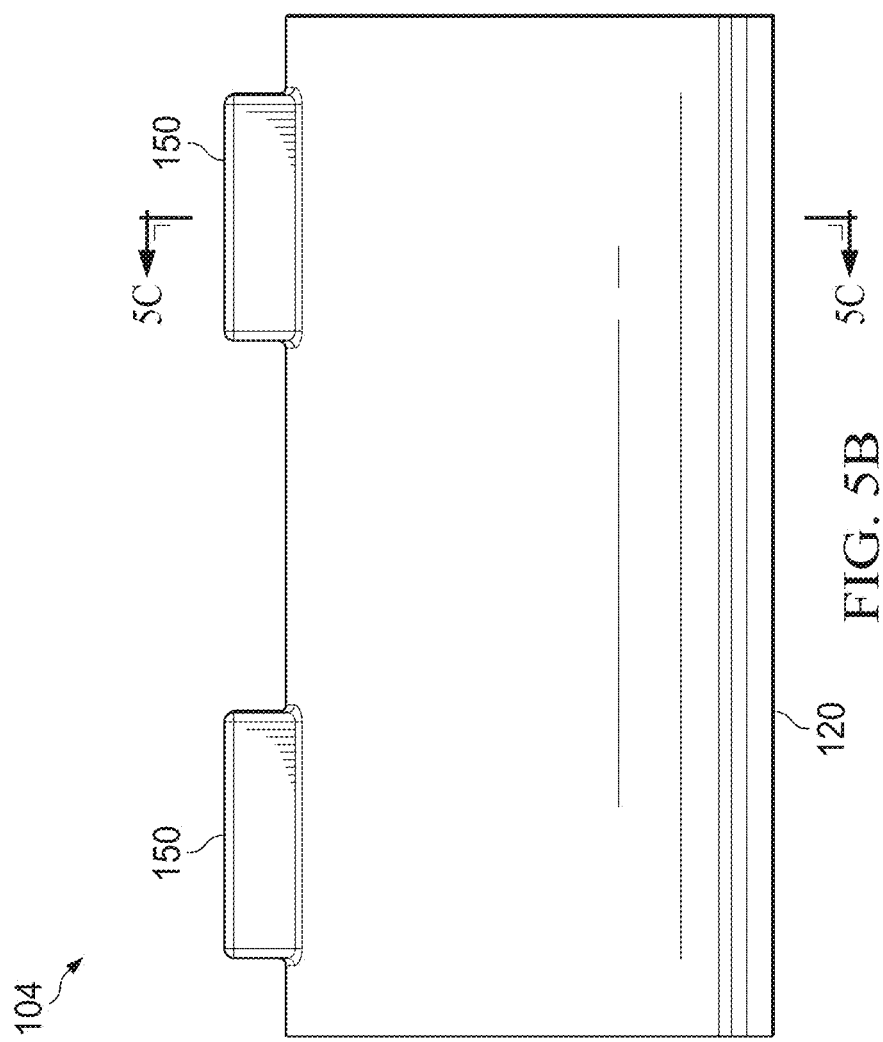
FIG. 5B
FIG. 5C

STORAGE SYSTEM FOR CHICKEN FEEDERS

CROSS-REFERENCE TO RELATED APPLICATIONS

This application claims the benefit of, and hereby incorporates by reference for all purposes, U.S. patent application Ser. No. 14/512,164, entitled "Storage System for Chicken Feeders," filed Oct. 10, 2014.

TECHNICAL FIELD

This disclosure relates to feeders for chickens, and in particular, to an apparatus, system and method for storing chicken feeders in an efficient manner between uses.

BACKGROUND OF THE DISCLOSURE

A chicken producer often uses multiple sizes and/or types of chicken feeders to feed a group of chickens as the group grows and matures. For example, a chicken producer may use small chicken feeders having low profile feed dishes during the first several weeks of a chicken's life and larger feeders for the remainder of the chicken's life. The low profile dish of the smaller feeders allows recently-hatched chicks to access food in the feed dish. The larger feeders allow the chickens to eat as they grow and mature. As the chickens grow, the smaller, low-profile feeders become unsuitable for feeding and must be removed to avoid contamination of food in the smaller feeders by the matured chickens stepping into the feed trays and to provide adequate space for the mature chicken to eat from the larger feeders. As such, the chicken producer removes the smaller feeders and stores the feeders at a location outside of the feeding area. Oftentimes, the chicken producer must disassemble each feeder in order to store the feeders in an organized manner.

When the chickens reach the desired size and/or age, the chicken producer removes the chickens from the feeding area and prepares the feeding area for a new group of recently-hatched chicks. Before moving the recently-hatched chicks into the feeding area, the feed producer must retrieve the smaller feeders from their storage location, reassemble the feeders, and then place the assembled feeders at the desired locations in the feeding area. Due to the relatively short timeframe from the birth of a group of chicks to harvesting of the matured chickens (typically between about six to nine weeks), as well as the large number of chicken feeders required to feed a group of chickens, the process of removing, disassembling, storing and reinstalling the feeders is very time consuming and labor intensive. It would be beneficial to have a storage means for chicken feeders that is convenient to use and reduces the time and labor involved in removing, storing and reinstalling the chicken feeders between uses.

SUMMARY

In a first aspect, there is provided a feeder storage apparatus for storing a chicken feeder on a feed tube. The feeder storage apparatus includes a body section and a coupling member on a first end of the body section for securing the body section to the chicken feed tube. The apparatus also includes a feeder contacting section on a second end of the body section. The feeder contacting section includes at least one arm to support a feeder above the feed tube.

In a first aspect, a feeder storage apparatus for storing a chicken feeder on a chicken feed tube is provided. The feeder storage apparatus may include a body section, a mounting web substructure, and a feeder contacting section. The body section may have a laterally extending shelf including a first distal shelf section and a second distal shelf section. The mounting web substructure may be on a first end of the body section for securing the body section to the chicken feed tube and may include a bar extending between a first distal shelf terminus of the first distal shelf section and a second distal shelf terminus of the second distal shelf section. The feeder contacting section may be on a second end of the body section and may include at least one arm to support a feeder above the chicken feed tube.

In various embodiments, the laterally extending shelf comprises a discontinuous laterally extending shelf at a bottom end of the body section.

In another embodiment, the first distal shelf section is proximate to a first distal end of a bottom end of the body section and extends toward the second distal shelf section and terminates at the first distal shelf section terminus. Moreover, the second distal shelf section is proximate to a second distal end of the bottom end of the body section opposite the first distal end and extends toward the first distal shelf section and terminates at the first distal shelf section terminus. Furthermore, a space between the first distal shelf section and the second distal shelf section is occupied by the mounting web substructure.

In yet another embodiment, a connecting aperture is defined through and bounded by the mounting web of the mounting web substructure and configured to receive a fastener through the connecting aperture to maintain the body section and a coupling member in mechanical communication.

Moreover, the mounting web may be integrally formed with the body section.

Additionally, the mounting web further may include an inward web edge having a surface of the mounting web that is closest to the feeder contacting section of the feeder storage apparatus and an outward web edge having a surface of the mounting web that is opposite the inward web edge and farthest from the feeder contacting section.

In some embodiments, the outward web edge is aligned flush with an outward flange edge of the laterally extending shelf.

In various instances, the outward web edge is inward of an outward flange edge of the laterally extending shelf by an outward web inset distance extending between the outward flange edge and the outward web edge, and the outward web inset distance is selected to align a coupling member to be flush with the outward flange edge when joined to the mounting web substructure.

In some instances, the inward web edge is outward of an inward flange edge of the laterally extending shelf by an inward web inset distance extending between the inward flange edge and the inward web edge, and the inward web inset distance is selected to align a coupling member to be flush with the inward flange edge when joined to the mounting web substructure.

In various embodiments, a connecting aperture is defined through and bounded by the mounting web of the mounting web substructure and configured to receive a fastener through the connecting aperture to maintain the body section and the chicken feed tube in mechanical communication.

The connecting aperture has a center spaced: an inward edge distance from the inward web edge, an outward edge distance from the outward web edge, a first distal shelf distance from the first distal shelf terminus, and a second distal shelf distance from the second distal shelf terminus. The inward edge distance and the outward edge distance are equal, and the first distal shelf distance and the second distal shelf distance are equal.

The body section may include a pair of support beams and one or more transverse beams extending between the support beams.

In various embodiments, the at least one arm includes a pair of arms, the arms angled towards each other and wherein the feeder contacting section includes a bent arm extending between the pair of arms.

Moreover, in further instances, the pair of arms are angled away from each other and the arms each include one or more fingers at a distal end of the arms.

In a second aspect, a feeder storage system is provided. The feeder storage system may include a feeder and a feeder storage apparatus. The feeder storage apparatus may have a body section, a mounting web substructure on a first end of the body section for securing the body section to at least one of a coupling member and a feed line, and a feeder contacting section extending from a second end of the body section. The feeder contacting section may support the feeder so that at least a portion of the feeder is supported above the feed line.

In various embodiments, the feeder contacting section includes arms for supporting the feeder.

In another embodiment, the feeder storage system includes a bent arm extending between the arms to support the feeder.

In yet further embodiments, the arms include a first finger, a second finger and a recess located between the first finger and the second finger for receiving an edge of a hopper of the feeder.

In still further embodiments, the mounting web substructure includes a mounting web. The mounting web includes a rectangular bar in a space of a discontinuous laterally extending shelf of the body section. A connecting aperture is defined through and bounded by the mounting web of the mounting web substructure and configured to receive a fastener through the connecting aperture to maintain the body section and at least one of the coupling member and the feed line in mechanical communication.

In a third aspect, a method for storing a chicken feeder is provided. The method may include attaching a coupling member of a feeder storage apparatus that is connected to a mounting web substructure of the feeder storage apparatus to a feed tube so that a body section of the feeder storage apparatus and a feeder contacting section of the feeder storage apparatus extend upwardly from the feed tube. The method may include placing the chicken feeder in an inverted position on the feeder contacting section of the feeder storage apparatus so that at least part of the chicken feeder is supported above the feed tube.

In various instances, the body section includes a discontinuous laterally extending shelf having a first distal shelf section and a second distal shelf section, the mounting web substructure has a rectangular bar in a space of the discontinuous laterally extending shelf, and a connecting aperture is defined through and bounded by the rectangular bar and is configured to receive a fastener through the connecting aperture to connect the coupling member to the mounting web substructure.

Other aspects, features, and advantages will become apparent from the following detailed description when taken in conjunction with the accompanying drawings, which are part of this disclosure and which illustrate, by way of example, principles of the inventions disclosed.

DESCRIPTION OF THE FIGURES

The accompanying drawings facilitate an understanding of the various embodiments.

FIG. 5B is a side view of a coupling section of a feeder storage apparatus in accordance with this disclosure.

FIG. 5C is a section view taken along line 5C-5C of FIG. 5B.

DETAILED DESCRIPTION

Figure 1:
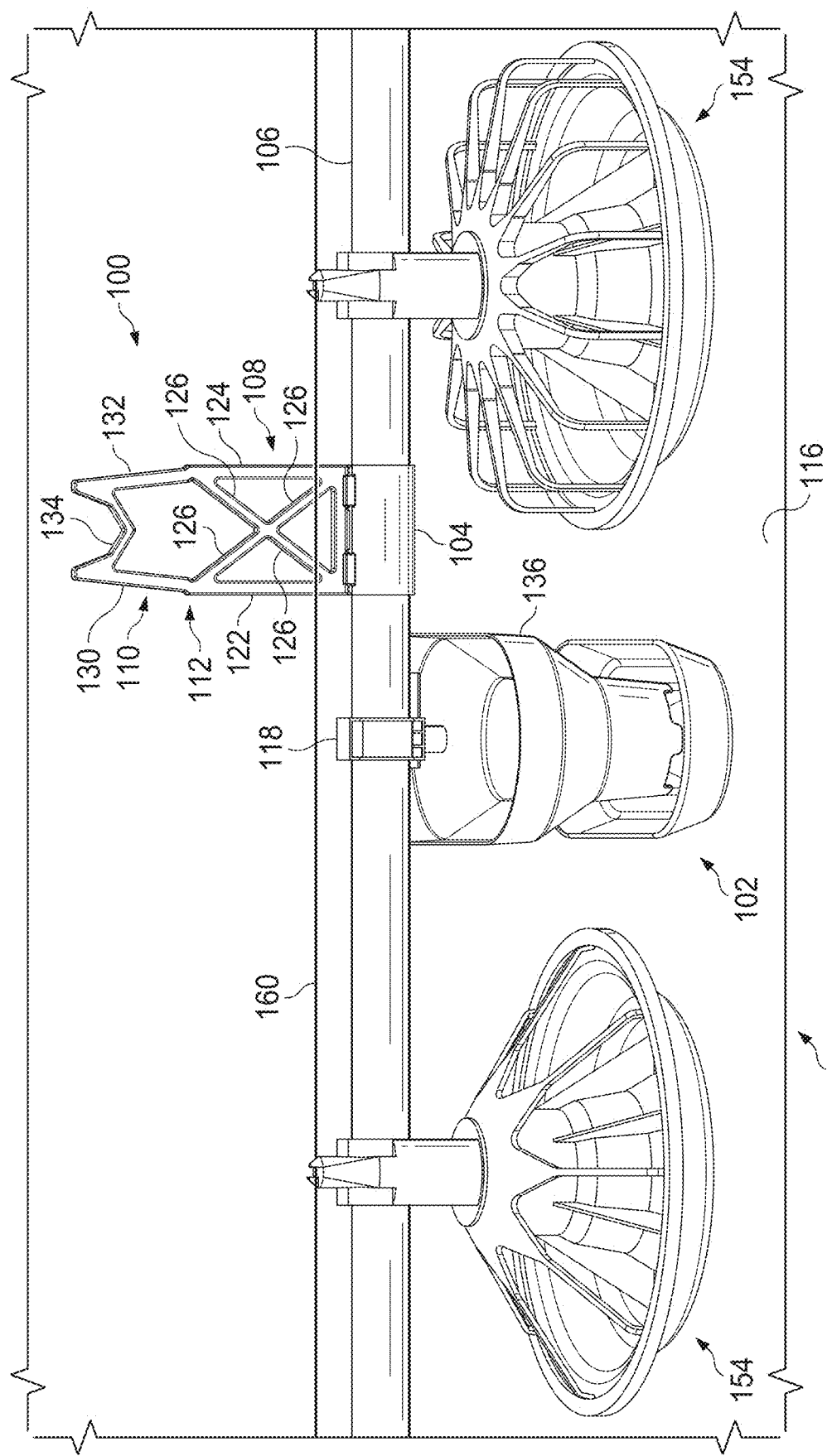
FIG. 1 is a perspective view of a chicken feeder storage apparatus coupled to a feed line in accordance with this disclosure.
Figure 2:
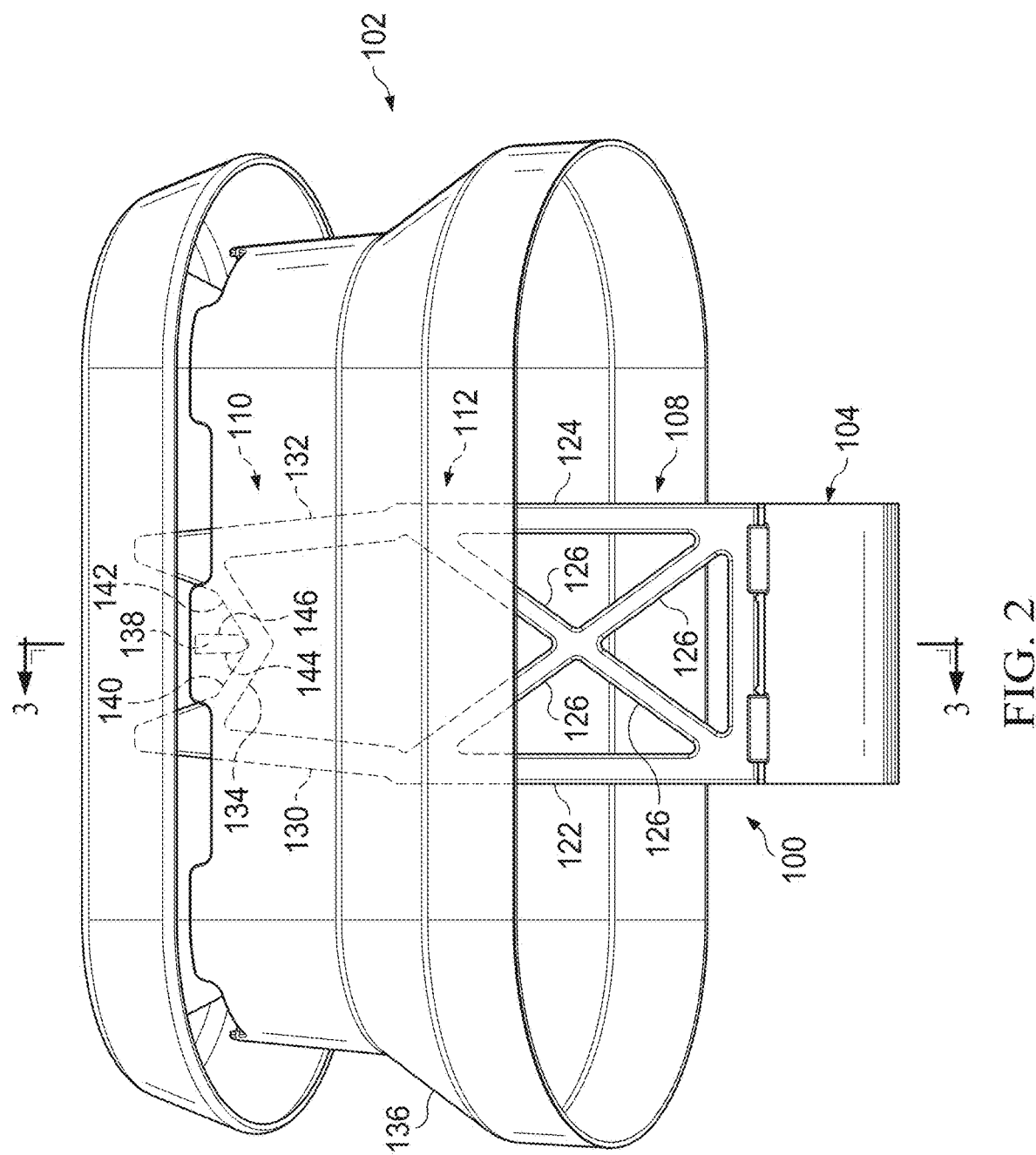
FIG. 2 is a perspective view of a chicken feeder storage apparatus with a chicken feeder resting thereon in accordance with this disclosure.
Figure 3:
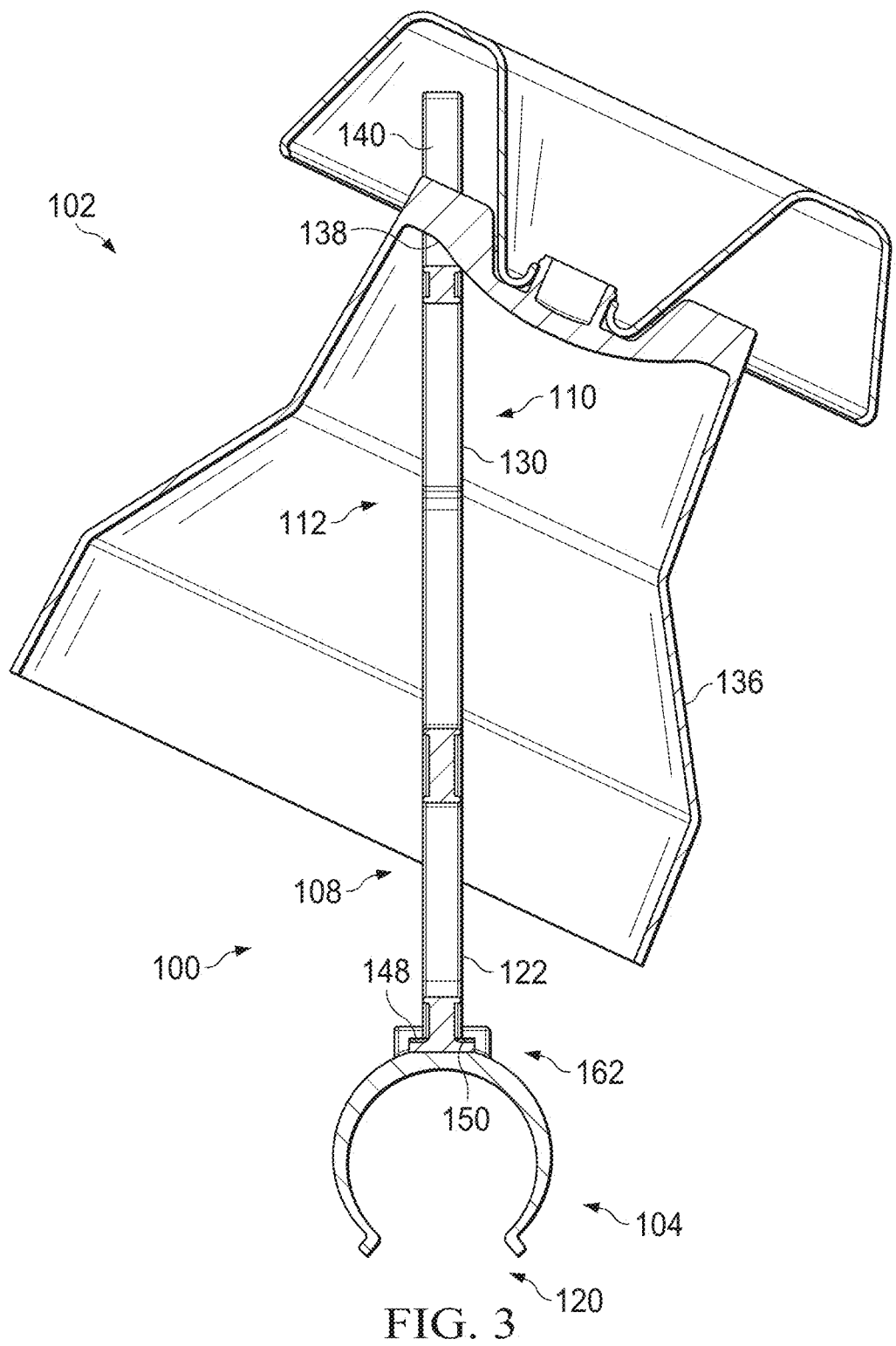
FIG. 3 is a side section view of a chicken feeder storage apparatus with a chicken feeder resting thereon in accordance with this disclosure.
Figure 4:
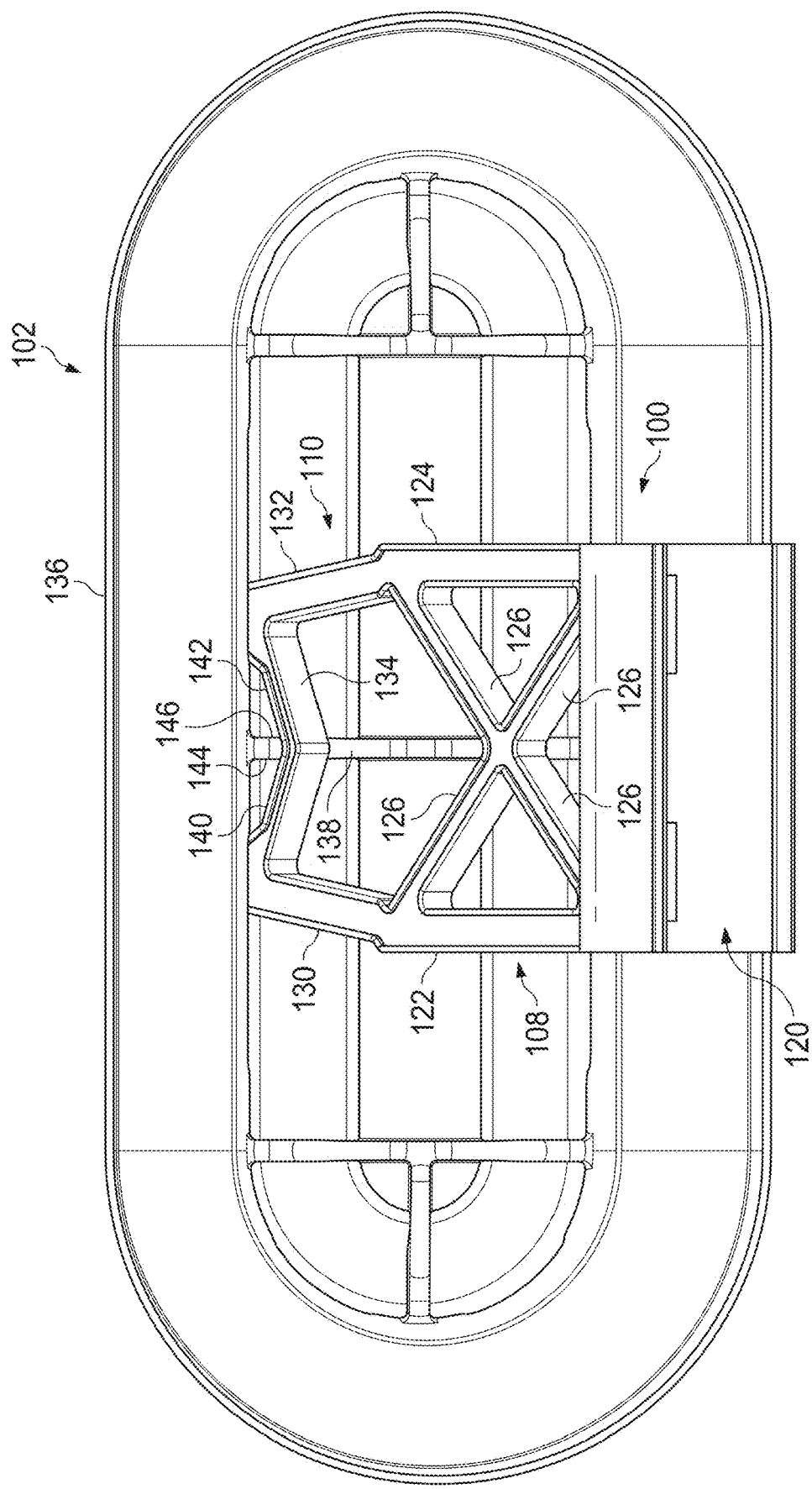
FIG. 4 is a bottom perspective view of a chicken feeder storage apparatus with a chicken feeder resting thereon in accordance with this disclosure.

FIGS. 1-6 and 12-15D illustrate an embodiment of a feeder storage apparatus 100 for convenient storage of a chicken feeder 102 when the chicken feeder 102 is not in use. The feeder storage apparatus 100 includes a coupling member 104 for securing the feeder storage apparatus 100 to a feed tube 106, a body section 108, and a feeder contacting section 110 on a first end 112 of the body section 108 to support a chicken feeder 102 above the feed tube 106. In various embodiments, the coupling member 104 is omitted and in various embodiments, logically subsumed within the features of the body section 108. In various embodiments, the coupling member 104 comprises separately joinable halves 501 and 550, As illustrated in FIG. 1, the feeder storage apparatus 100 is coupleable to the feed tube 106 at a position that is close to the location of the chicken feeder 102 when the chicken feeder 102 is in use (i.e., when the chicken feeder 102 is positioned on a floor 116 of the feeding area 114). During normal operation, the chicken feeder 102 rests on the floor 116 of the feeding area 114 beneath the feed tube 106. In some instances, the feeding area 114 also includes larger chicken feeders 154 that are permanently attached to the feed tube 106 and are configured to feed the chickens once they have grown and matured. The chicken feeders 102 and the larger chicken feeders 154 are located below the feed tube 106 to receive food from the feed tube 106. The chicken feeders 102 are removable and smaller and are each positioned a feed outlet 118 in the feed tube 106 so food that exits the feed outlet 118 drops into the chicken feeders 102. When the chickens have reached a desired maturity, the chicken feeders 102 for small chickens are no longer required and thus, can be removed in order to avoid contamination of food in the chicken feeders 102 for small chickens (for example, contamination caused by the matured chickens stepping into the chicken feeders 102 for small chickens) and to provide adequate space for the mature chicken to eat from the larger chicken feeders 154. As such, the chicken producer removes the chicken feeders 102 for small chickens from the floor 116 and places the chicken feeders 102 in an inverted orientation on the feeder contacting section 110 of the feeder storage apparatus 100, as shown in FIGS. 2-4. The chicken feeder 102 is thus stored on the feeder storage apparatus 100 in a location proximate to the feeder's position on the feeding area 114 when the chicken feeder 102 is in use. As such, the time and effort required to store the chicken feeder 102 is greatly reduced. In addition, the chicken producer stores the chicken feeder 102 in a fully-assembled configuration on the feeder storage apparatus 100 so that the producer need not disassemble and then reassemble the chicken feeder 102 between uses. The chicken feeders 102 are stored in an organized manner that does not obstruct the use of the larger chicken feeders 154 in the feeding area 114 and does not require a separate storage area for the chicken feeders 102. As will be described in more detail below, when the producer desires to replace the chicken feeders 102 to their location on the feeding area 114, the producer simply lifts the chicken feeders 102 off of the feeder storage apparatus 100 and places the chicken feeders 102 below the feed outlets 118. As such, the time and effort to reinstall the chicken feeders 102 is also greatly reduced.

Referring specifically to FIG. 1, the feeder storage apparatus 100 is fixed to the feed tube 106 by securing the coupling member 104 to the feed tube 106 such that the body section 108 and the feeder contacting section 110 are positioned above the feed tube 106 in a substantially vertical orientation. In some embodiments, the coupling member 104 surrounds at least part of the feed tube 106 to couple the feeder storage apparatus 100 to the feed tube 106 by a friction fit. In other embodiments, the coupling member 104 includes one or more fasteners (not shown), or any other suitable fastening mechanism, to secure the feeder storage apparatus 100 to the feed tube 106. In still further embodiments, the coupling member is omitted and/or is an integral aspect of the body section 108 so that the body section 108 is unitary with the coupling member 104. In yet further embodiments, the coupling member comprises two joinable portions, such as a first coupling member side portion 501 and a second coupling member side portion 550. For instance, with reference to FIGS. 1, and 12-1, in various embodiments, a coupling member 104 may join to a mounting web substructure 406 of a body section 108, or the coupling member 104 may be the mounting web substructure 406 of the body section 108 so that the mounting web substructure 406 of the body section 108 joins directly to the feed tube 106, such as by a fastener inserted through a connecting aperture 416. Moreover, with additional reference to FIGS. 15A-D, in various embodiments, a coupling member 104 may comprise a first coupling member side portion 501 and a second coupling member side portion 550. The first coupling member side portion 501 and the second coupling member side portion 550 may each join to a mounting web substructure 504 of a body section 108 and couple the body section 108 to a feed tube 106, such as with a fastener inserted through a connecting aperture 416 to join the first and second coupling member side portions 501 and 550 to the mounting web substructure 406. The coupling member 104 may be oriented so that the feed tube 106 passes through a channel 503 defined by the joined first and second coupling member side portions 501 and 550.

An embodiment of a coupling member 104 is shown in greater detail in FIGS. 3, 5B and 5C. Moreover as mentioned, the coupling member 104 may be subsumed as logically coincident with the mounting web substructure 406 (FIGS. 12-14) and in further embodiments, the coupling member 104 may be joinable to the mounting web substructure 406 (FIGS. 12-15D). In some embodiments, the coupling member 104 is cylindrical in shape and includes a transverse opening 120. In some embodiments, the coupling member 104 is made of a flexible material to allow the transverse opening 120 to expand so that the coupling member 104 can be snapped onto the feed tube 106. In other embodiments, the coupling member 104 has other shapes to correspond to the shape of other types of feed tubes 106.

A further embodiment of the coupling member 104 is shown in greater detail in FIGS. 15A-D. The coupling member 104 includes a first coupling member side portion 501 and a second coupling member side portion 550. The two side portions 501, 550 define a cylindrical channel 503 so that the first side portion 501 may be placed on one side of a feed tube 106 and the second side portion 550 may be placed on the opposite side of the feed tube 106 and proximal surfaces of the first and second side portions 501, 550 unite in mechanical communication to form a channel 503 through which the feed tube 106 extends. In various embodiments, the first and second coupling member side portions 501, 550 further comprise conjugate tabs and receptacles that interface upon the union of the first and side coupling member portions 501, 550, for instance, tabs 505 and slots 507. Moreover, the first and second side portions 501, 550 may comprise apertures configured to receive fasteners to retain the first and second side portions 501, 550 in mechanical communication with each other. For instance, each of the first and second side portions 501, 550 may comprise a mounting web substructure mating aperture 508 to receive a fastener to extend through the first side portion 501, the aperture 416 of the mounting web substructure 406 (FIG. 12-14), and through the second side portion 550. One or more further apertures may receive a fastener to extend through the first coupling member side portion 501 and through the second side portion 550. For instance mounting ear apertures 509 defined through mounting ears 510 of the first and second side portion 501, 550 may each receive fasteners.

The body section 108 of the feeder storage apparatus 100 is shown in greater detail in FIGS. 2, 5A, and 12-14. The body section 108 of the feeder storage apparatus 100 is located between the coupling member 104 and the feeder contacting section 110 and is configured to maintain a specified distance between the coupling member 104 and the feeder contacting section 110. In some embodiments, the body section 108 is sized such that when a chicken feeder 102 is placed on the feeder storage apparatus 100 the chicken feeder 102 does not contact the feed tube 106 and/or an electrical line 160 (see FIG. 1) located above the feed tube 106. For example, in some embodiments the electrical line 160 is located approximately 1.5 inches above the feed tube 106 and the body section 108 is between about 5 inches and about 7 inches in length to allow the chicken feeder 102 to rest on the feeder contacting section 110 without interfering with the electrical line 160.

In some embodiments, the body section 108 includes a first beam member 122, a second beam member 124 and one or more transverse members 126. The transverse members 126 provide structural strength to the body section 108 and extend at non-vertical angles between the first beam member 122 and the second beam member 124. In other embodiments, the body section 108 has other configurations. For example, in some embodiments the body section 108 is a solid, planer piece of material. In other embodiments, the body section 108 includes a first beam member 122 and a second beam member 124 and does not include transverse members 126. In other embodiments, the body section 108 may have any other suitable configuration to maintain a specified distance between the feeder contacting section 110 and the coupling member 104.

With continued reference to FIGS. 2, 5A, and 12-14, in some embodiments the feeder contacting section 110 includes a first arm 130, a second arm 132 and a bent arm 134 (also known in various embodiments as a "convex" arm). In some embodiments, the first arm 130 and the second arm 132 are angled toward each other so that the first arm 130 and the second arm 132 fit within hopper 136 (for instance, an inverted hopper) of the chicken feeder 102, as best illustrated in FIGS. 2 and 4.

Referring now specifically to FIGS. 2-4, in some embodiments the bent arm 134 of the feeder contacting section 110 is shaped to fit around at least part of a rib 138 or other internal feature of a hopper 136 (such as an inverted hopper) of the chicken feeder 102. As illustrated in FIGS. 2 and 4, in some embodiments a first side 140 of the bent arm 134 contacts a first side 144 of the rib 138 and a second side 142 of the bent arm 134 contacts the second side 146 of the rib 138 to hold the chicken feeder 102 on the feeder storage apparatus 100. In other embodiments, the hopper 136, such as an inverted hopper, of the chicken feeder 102 has other features that can be placed within the bent arm 134 of the feeder contacting section 110 to hold the chicken feeder 102 on the feeder storage apparatus 100. In various embodiments, the bent arm 134 may be a convex arm. For example, the convex arm may have a point of inflection comprising the portion of the arm closest to the bottom end 162 of the body section 108. Stated differently, the convex arm may exhibit convexity toward the body section 108 and concavity toward the chicken feeder 102. In further embodiments, the bent arm 134 may comprise any variety of shapes, for instance, having a straight profile, a curved profile, having notches disposed therein, and/or any shape as desired to interface with a chicken feeder 102.

Figure 5A:
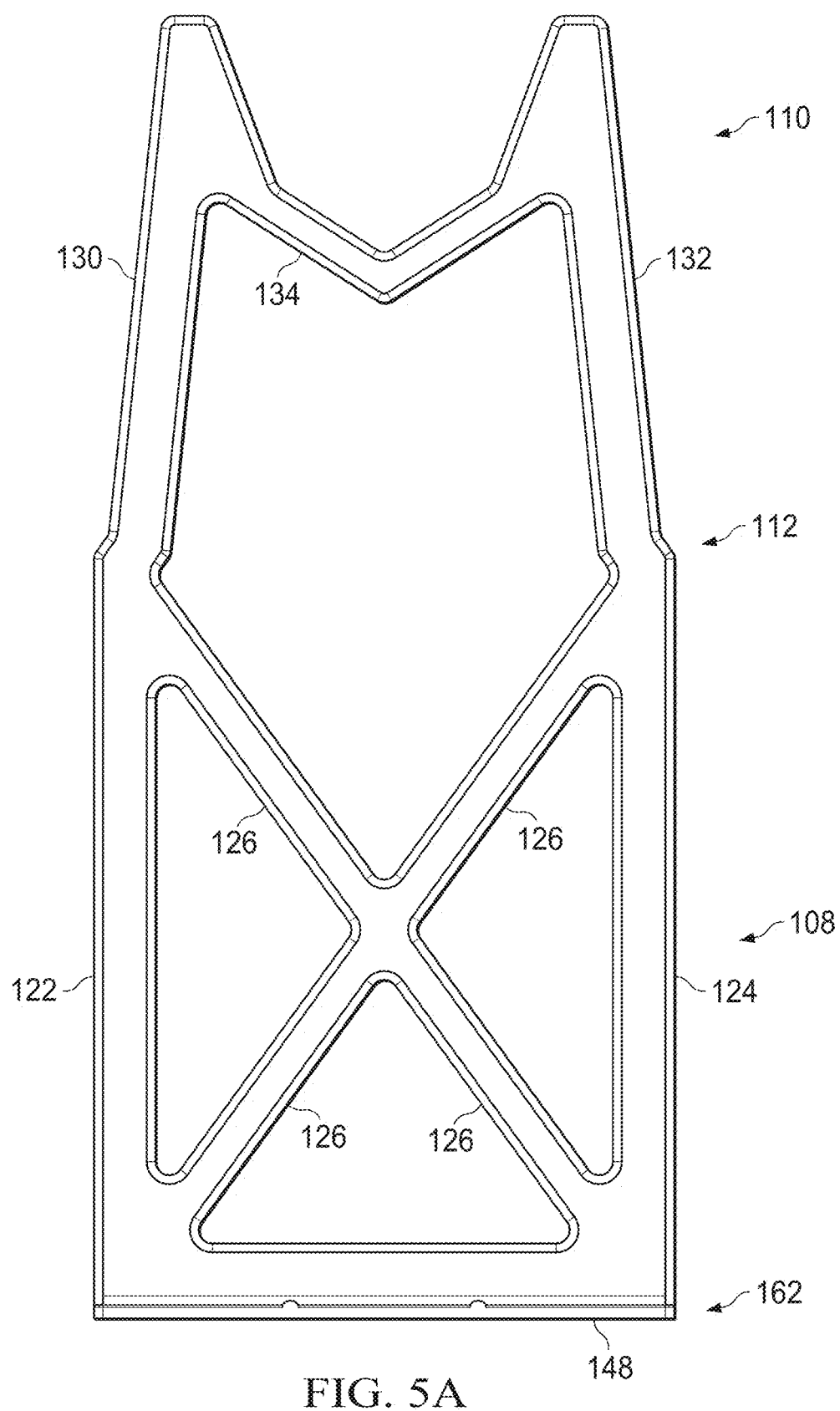
FIG. 5A is a front view of a body section and a feeder contacting section of a feeder storage apparatus in accordance with this disclosure.

Referring now to FIGS. 5A-5C, in some embodiments the body section 108 is removably coupled to the coupling member 104 by way of one or more slots 150 on the coupling member 104. The body section 108 includes a laterally extending shelf 148 at a bottom end 162 of the body section 108 that is configured to mate with one or more slots 150 on the coupling member 104. In some embodiments, the body section 108 couples to the coupling member 104 by slideably engaging the shelf 148 with the one or more slots 150. In the embodiments illustrated in FIG. 5B, the coupling member 104 includes two of the slots 150 to couple the shelf 148 to the coupling member 104. In yet other embodiments, the body section 108 is coupled to the coupling member 104 using other mechanisms, such as one or more fasteners. In still other embodiments, the body section 108 is integral with the coupling member 104.

Figure 6:
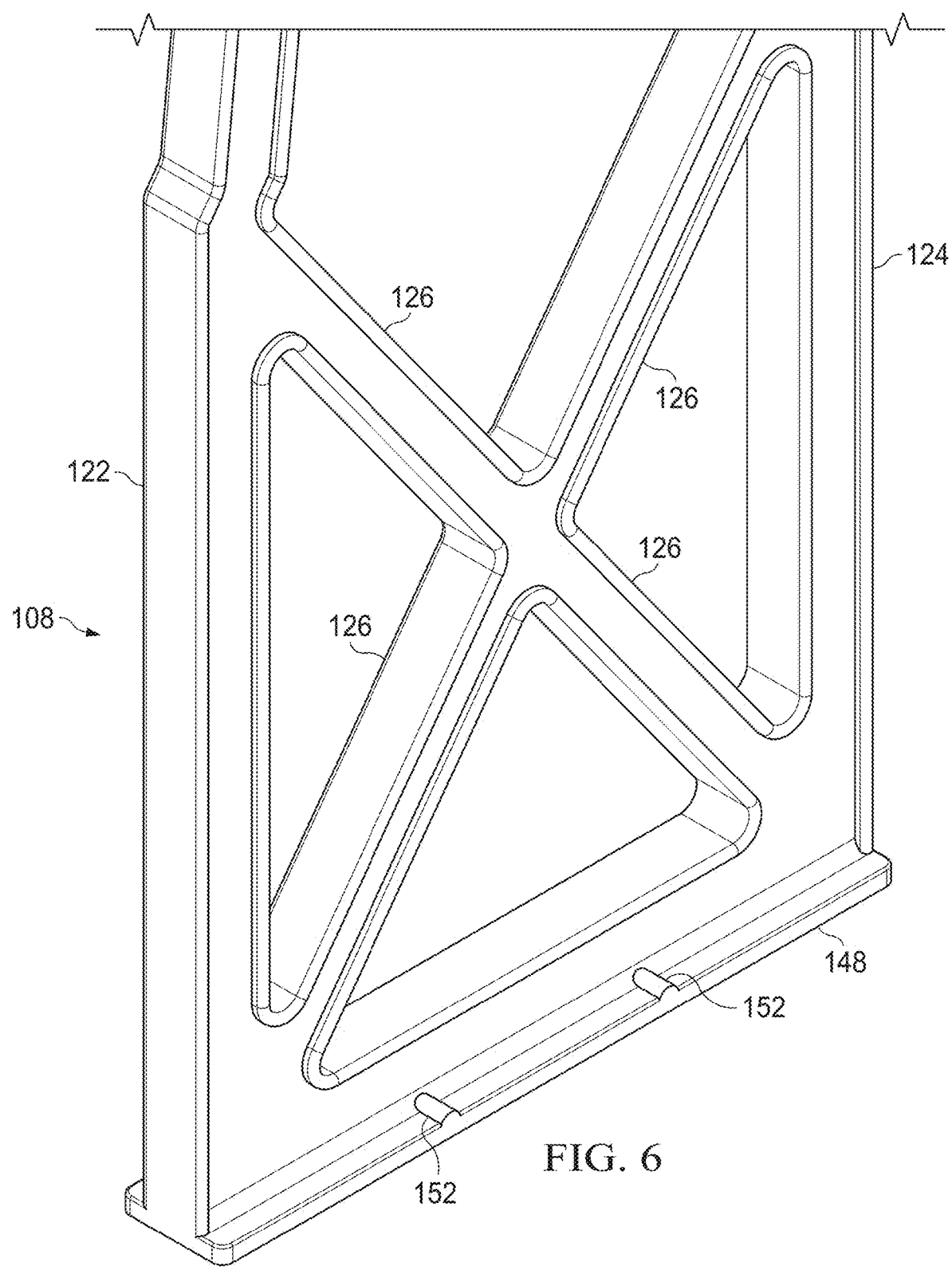
FIG. 6 is a perspective view of a body section of a feeder storage apparatus in accordance with this disclosure.

Referring now to FIG. 6, in some embodiments the lateral extending shelf 148 of the body section 108 include protrusions 152 to removably lock the shelf 148 to the one or more slots 150 (see FIGS. 5B and 5C) so that the coupling member 104 is correctly aligned with respect to the body section 108. In some embodiments, the one or more slots 150 also include corresponding indentations (not shown) to receive the protrusions 152 when the body section 108 is correctly positioned on the coupling member 104.

Referring now to FIGS. 5A-5C and additionally, to FIGS. 12-14 and 15A-15D, in some embodiments the body section 108 is joined to a mounting web substructure 406. In various embodiments, the body section 108 is integrally and continuously joined to the mounting web substructure 406 meaning that the body section 108 and mounting web substructure 406 are made of a single piece of material. The body section 108 may be removably coupled to the coupling member 104 by way of one or more mounting web substructure 406 connected to the body section 108. The body section 108 includes a laterally extending shelf 148 at a bottom end 162 of the body section 108 that is discontinuous. For instance, the laterally extending shelf 148 may have a first distal shelf section 402 and a second distal shelf section 404 proximate to opposite distal ends of the edge of the bottom end 162 and having a space there between which is occupied by the mounting web substructure 406. The mounting web substructure 406 may be configured to selectably couple with the coupling member 104. For instance, the mounting web substructure 406 may comprise a mounting web 428 configured to be received within a slot of the coupling member 104 and/or between two sides of the coupling member, for instance a first coupling member side portion 501 (FIG. 15A-D) and a second coupling member side portion 550 (FIG. 15A-D). In some embodiments, the body section 108 couples to the coupling member 104 by slideably engaging the mounting web 428 with a slot. In various embodiments, a fastener may be inserted through a connecting aperture 416 to maintain the body section 108 and the coupling member 104 in mechanical communication, for instance as inserted through a mounting web substructure mating aperture 508 of a first coupling member side portion 501 (FIG. 15A-D), through the connecting aperture 416, and through a mounting web substructure mating aperture 508 of a second coupling member side portion 550 (FIG. 15A-D). Moreover, in various embodiments, the coupling member 104 is omitted such that the mounting web substructure 406 is directly connectable to various other aspects as discussed herein.

Figure 12:
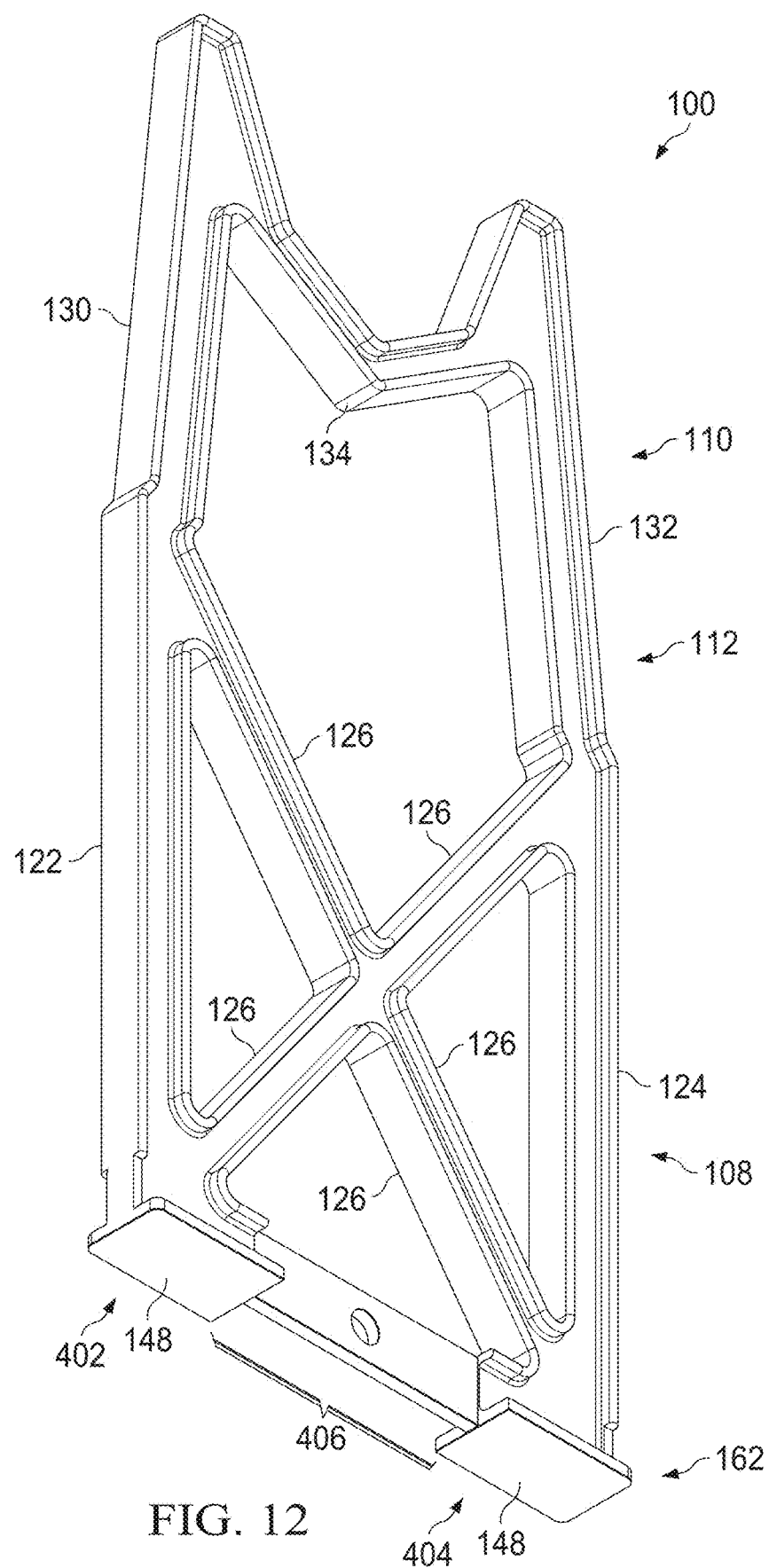
FIG. 12 is a perspective view of a feeder storage apparatus having a mounting web substructure in accordance with this disclosure.
Figure 13:
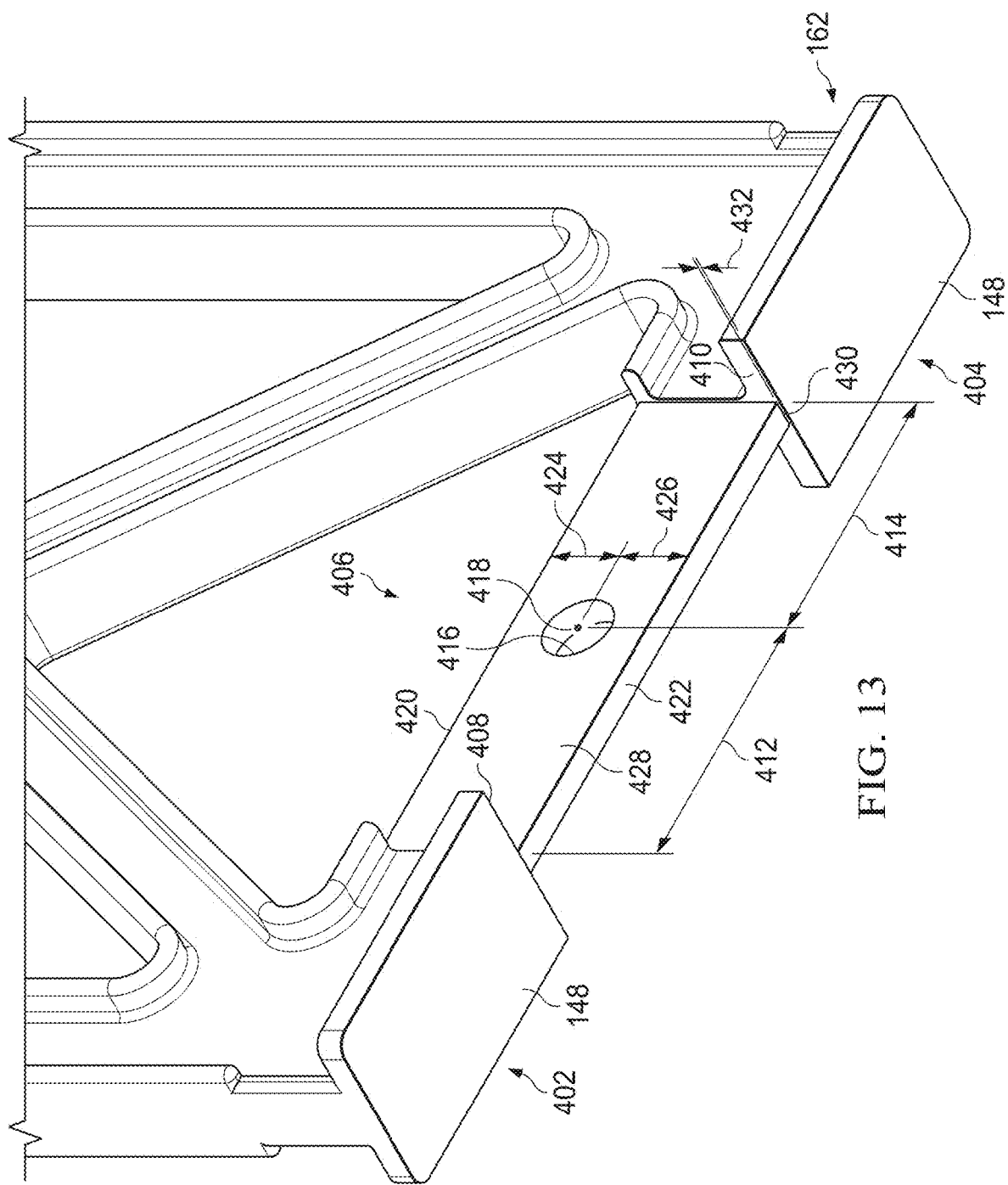
FIG. 13 is a perspective view of a feeder storage apparatus having a web substructure with particular emphasis on the outward web edge of the web substructure in accordance with this disclosure.
Figure 14:
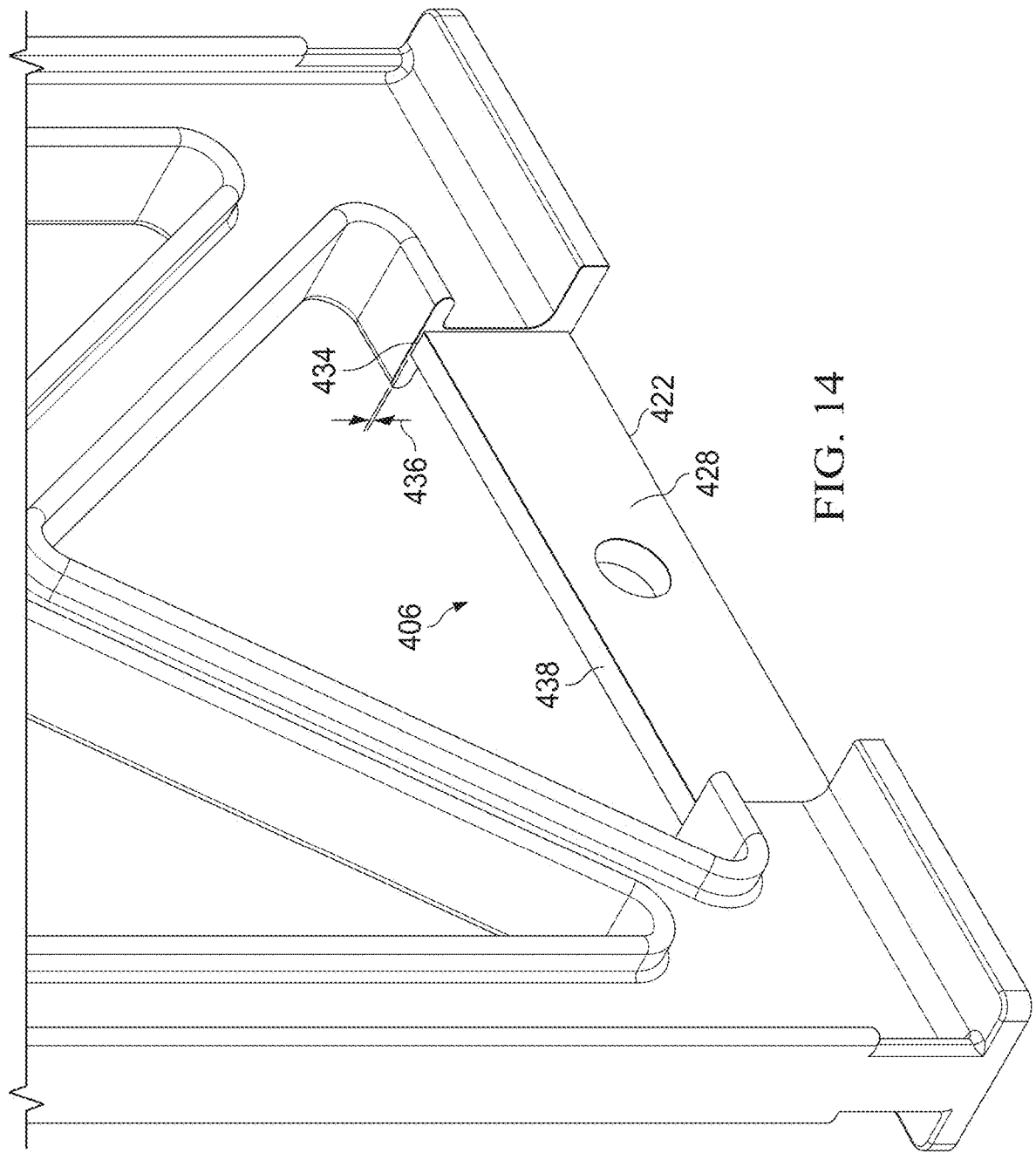
FIG. 14 is a perspective view of a feeder storage apparatus having a web substructure with particular emphasis on the inward web edge of the web substructure in accordance with this disclosure.
Figure 15B:
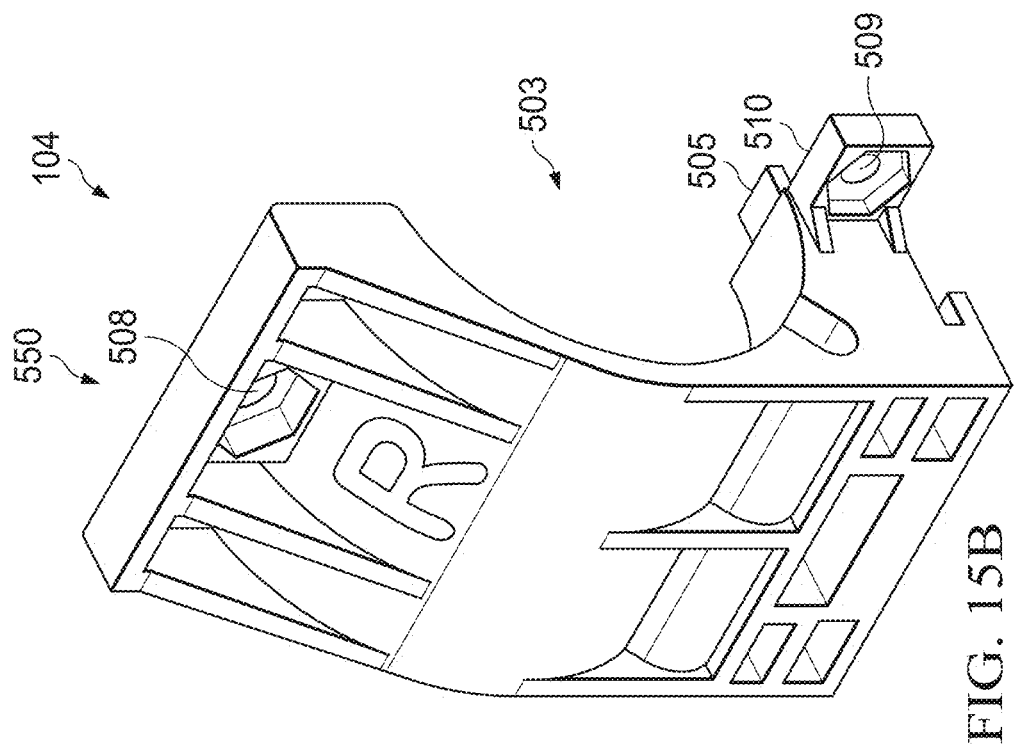
FIGS. 15A-D are views of a coupling section joinable to a mounting web substructure of a feeder storage apparatus in accordance with this disclosure.
Figure 15A:
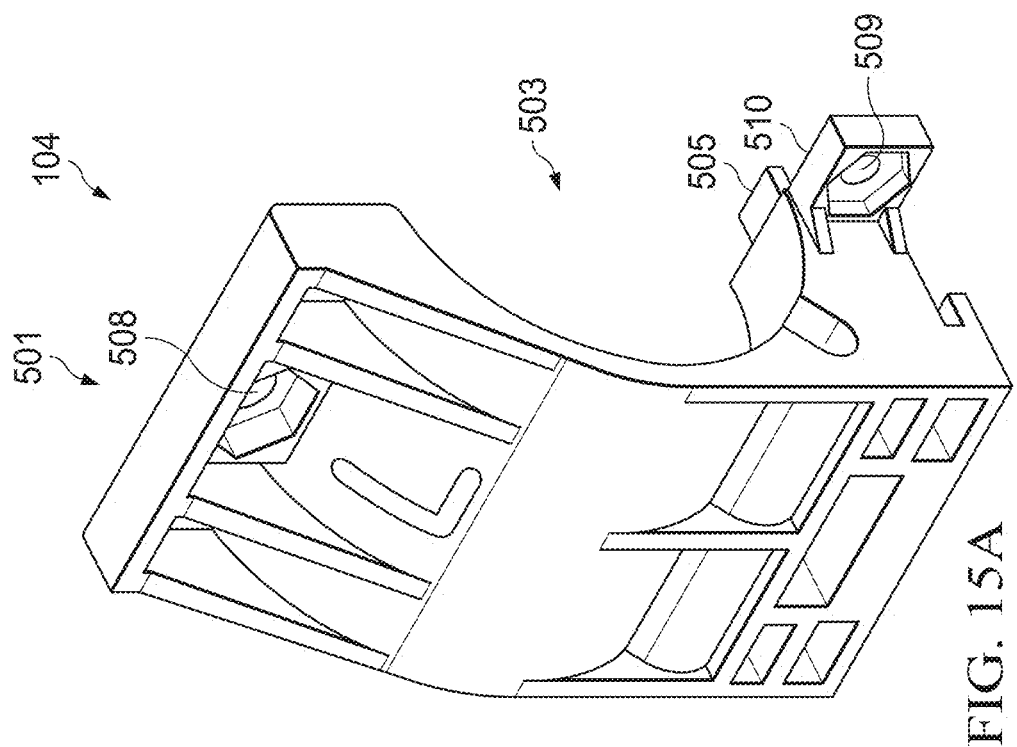
Figure 15C:
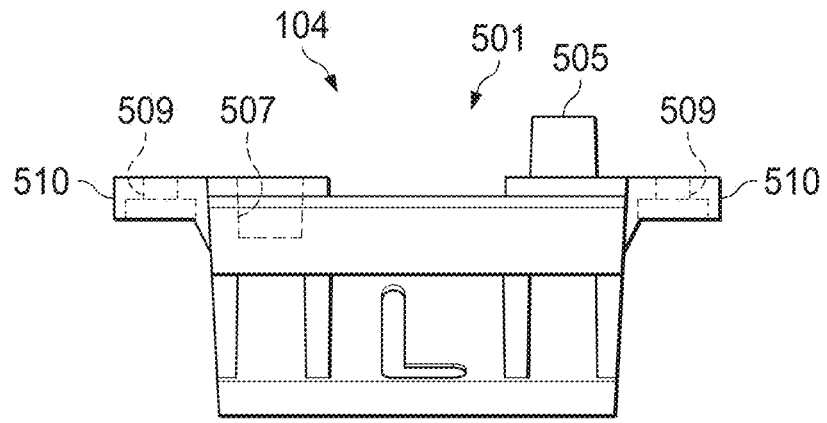
Figure 15D:
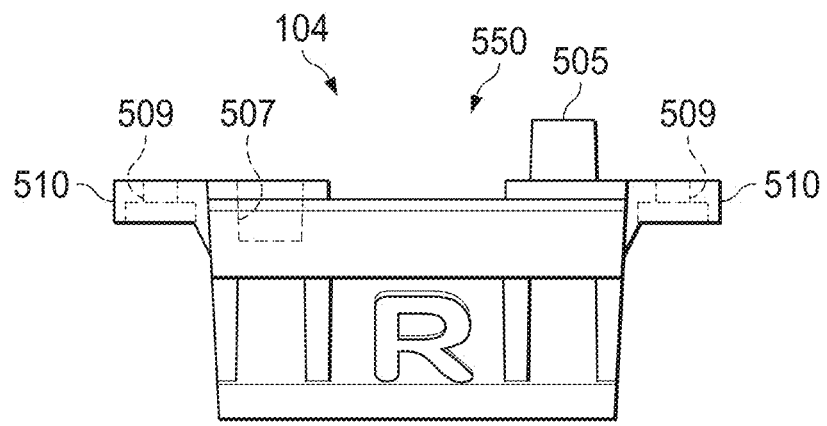

Referring now to FIGS. 12-14, in some embodiments the lateral extending shelf 148 of the body section 108, and specifically the first distal shelf section 402 and second distal shelf section 404 include a first distal shelf terminus 408 and a second distal shelf terminus 410 comprising the boundaries of the respective shelf sections. An aspect of the coupling member 104 may be sized to abut the first distal shelf terminus 408 and second distal shelf terminus 410 so that the coupling member 104 is correctly aligned with respect to the body section 108.

With ongoing reference to FIGS. 12-14, further aspects of a feeder storage apparatus 100 having a mounting web substructure 406 are disclosed. In various embodiments, the web substructure is an aspect of a coupling member 104 and in further embodiments the mounting web substructure 406 is an aspect of the body section 108.

The web substructure may be disposed at the bottom end 162 of the body section 108. The body section 108 includes a laterally extending shelf 148 at a bottom end 162 of the body section 108 that is discontinuous. For instance, the laterally extending shelf 148 may have a first distal shelf section 402 and a second distal shelf section 404 proximate to opposite distal ends of the edge of the bottom end 162 and having a space there between which is occupied by the mounting web substructure 406. More specifically, the first distal shelf section 402 may extend from a distal edge of the bottom end 162 inwardly to a first distal shelf terminus 408. A first distal shelf terminus 408 may comprise an edge of the first distal shelf section 402 closest to the second distal shelf section 404. Similarly, a second distal shelf section 404 may extend from a distal edge of the bottom end 162 inwardly to a second distal shelf terminus 410. The second distal shelf terminus 410 may comprise an edge of the second distal shelf section 404 closest to the first distal shelf section 402. Thus the first distal shelf terminus 408 and the second distal shelf terminus 410 may define the bounds of a space in the discontinuous laterally extending shelf 148. The space may receive a mounting web substructure 406. For instance, the space may receive a mounting web 428. Moreover the space may receive a bar, such as a rectangular bar, which will be discussed further below.

The mounting web substructure 406 may comprise a mounting web 428. A mounting web 428 may comprise a bar, such as a rectangular bar, or a bar having any shape as desired, and extending between the first distal shelf terminus 408 and the second distal shelf terminus 410 and adjoining the laterally extending shelf 148 at each of its distal ends. In various embodiments, the mounting web 428 is integrally formed with the body section 108. In further embodiments, it is inserted between the first distal shelf terminus 408 and the second distal shelf terminus 410 and fixed in place such as by gluing, sonic welding, melting, welding, riveting, screwing, nailing, and/or any mechanism of affixation.

The mounting web 428 may comprise an inward web edge 438. The mounting web 428 may comprise an outward web edge 422. The inward web edge 438 may comprise a surface of the mounting web 428 closest to the feeder contacting section 110 of the feeder storage apparatus 100. Similarly, the outward web edge 422 may be opposite the inward web edge 438. In other words, the outward web edge 422 may be farthest from the feeder contacting section 110.

In various embodiments the outward web edge 422 is coextant (e.g., aligned flush) with the bottom end 162 of the feeder storage apparatus 100, e.g., coextant (e.g., aligned flush) with the outward flange edge 430 of the shelf 148. In further embodiments the outward web edge 422 is set inwardly of the bottom end 162 of the feeder storage apparatus 100, e.g., closer to the feeder contacting section 110 than the outward flange edge 430. Thus, an outward web inset distance 432 may extend between the outward flange edge 430 and the outward web edge 422.

In various embodiments the inward web edge 438 is coextant (e.g., aligned flush) with the inward flange edge 434 of the shelf 148. In further embodiments the inward web edge 438 is set outwardly of the inward flange edge 434 of the shelf 148, e.g., farther from the feeder contacting section 110 than the inward flange edge 434. Thus, an inward web inset distance 436 may extend between the inward flange edge 434 and the inward web edge 438.

The mounting web substructure 406 may comprise a connecting aperture 416. A connecting aperture 416 may comprise a hole bounded by and defined through the mounting web 428. In further embodiments, the connecting aperture 416 extends incompletely through the mounting web 428 and comprises one or more indentation having one or more floor.

The connecting aperture 416 may be a circular hole, though any shape or arbitrary cut out may be provided. For instance, the connecting aperture 416 may be keyed so that a fastener, such as a pin may be constrained in at least one degree of orientation upon insertion into the connecting aperture 416.

The connecting aperture 416 may have center 418. The center 418 may be spaced an inward edge distance 424 from the inward web edge 438 and an outward edge distance 426 from the outward web edge 422. In various embodiments, the inward edge distance 424 and the outward edge distance 426 are equal so that the connecting aperture 416 is aligned equidistant from the inward web edge 438 and outward web edge 422 of the mounting web 428.

The center 418 may be spaced a first distal shelf distance 412 from the first distal shelf terminus 408. The center 418 may be spaced a second distal shelf distance 414 from the second distal shelf terminus 410. In various embodiments, the first distal shelf distance 412 and the second distal shelf distance 414 are equal so that the connecting aperture 416 is aligned equidistant from the first distal shelf terminus 408 and the second distal shelf terminus 410.

As was mentioned, the mounting web substructure 406 may comprise a mounting web 428 with an outward web edge 422 spaced an outward web inset distance 432 from the outward flange edge 430 and an inward web edge 438 spaced an inward web inset distance 436 from the inward flange edge 434. In various embodiments, the outward web inset distance 432 and/or the inward web inset distance 436 are selected such that various other apparatus, such as a coupling member 104 (not shown) may be joined to the mounting web substructure 406 and align flush with one or more of the inward flange edge 434 and the outward flange edge 430. In this manner, discontinuities in the outer profile of the feeder storage apparatus 100 may be ameliorated, diminishing force concentrations, accumulation of debris on surfaces, and potentially sharp edges, as well as providing easily detectable indicia of proper alignment, such that users may align the components by feel alone.

Figure 7:
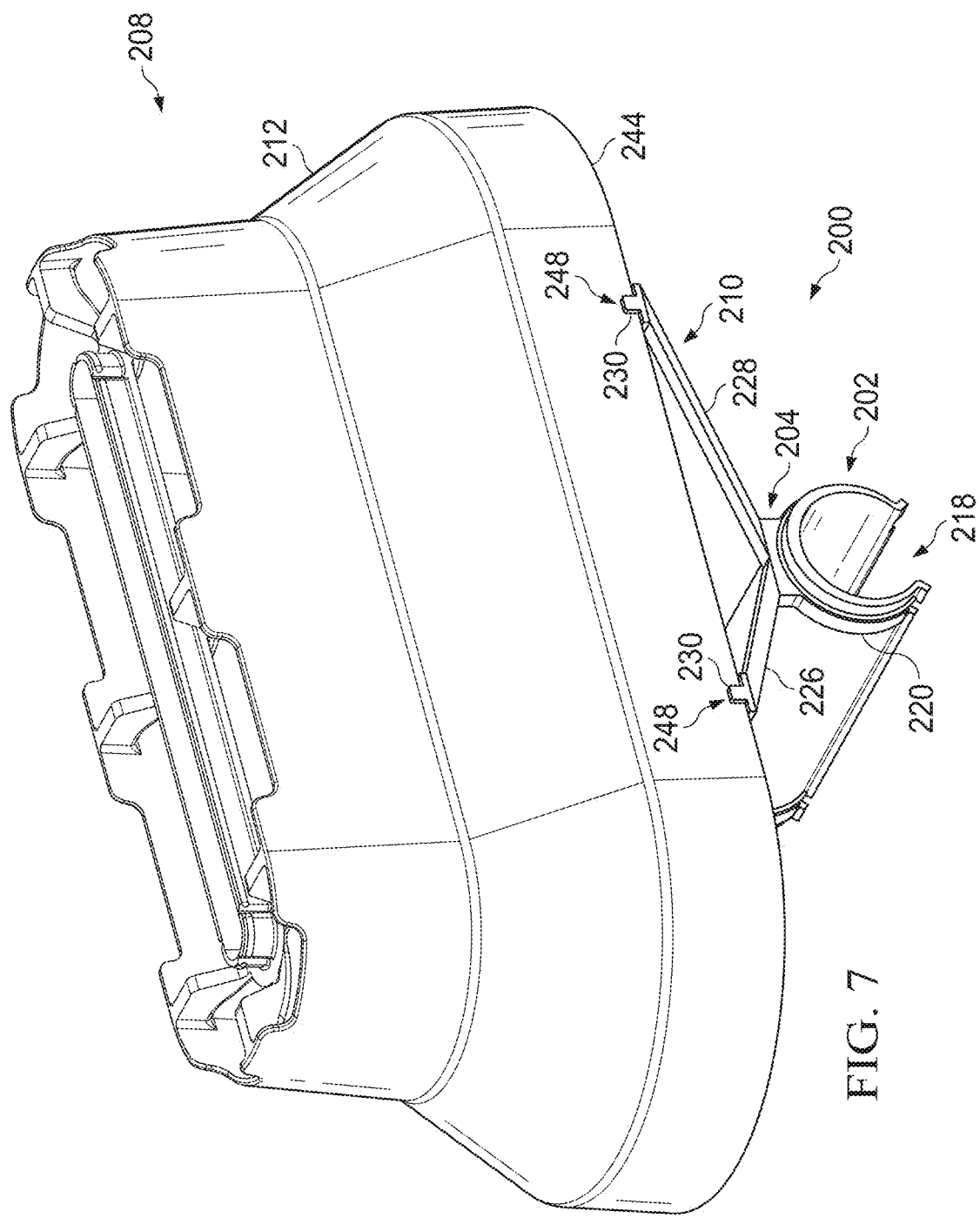
FIG. 7 is a perspective view of another embodiment of a feeder storage apparatus with a feeder resting thereon in accordance with this disclosure.

FIGS. 7-10 illustrate another embodiment of a feeder storage apparatus 200 for storing a feeder 208. Referring specifically to FIG. 7, the feeder storage apparatus 200 includes a coupling member 202 for securing the feeder storage apparatus 200 to the feed tube 106, a body section 204, and a feeder contacting section 210 for holding a feeder 208 above the feed tube 206 For clarity, the feeder 208 is shown with the tray removed in FIGS. 7 and 10. However, as discussed above, the tray remains attached to the chicken feeder 102 when the chicken feeder 102 is held on the feeder storage apparatus 200. Thus, the chicken feeder 102 need not be disassembled prior to storage. As will be described in more detail below, the feeder storage apparatus 200 stores the feeder 208 above the feed tube 206 by coupling the feeder contacting section 210 to an edge 244 of the hopper 212.

Figure 8:
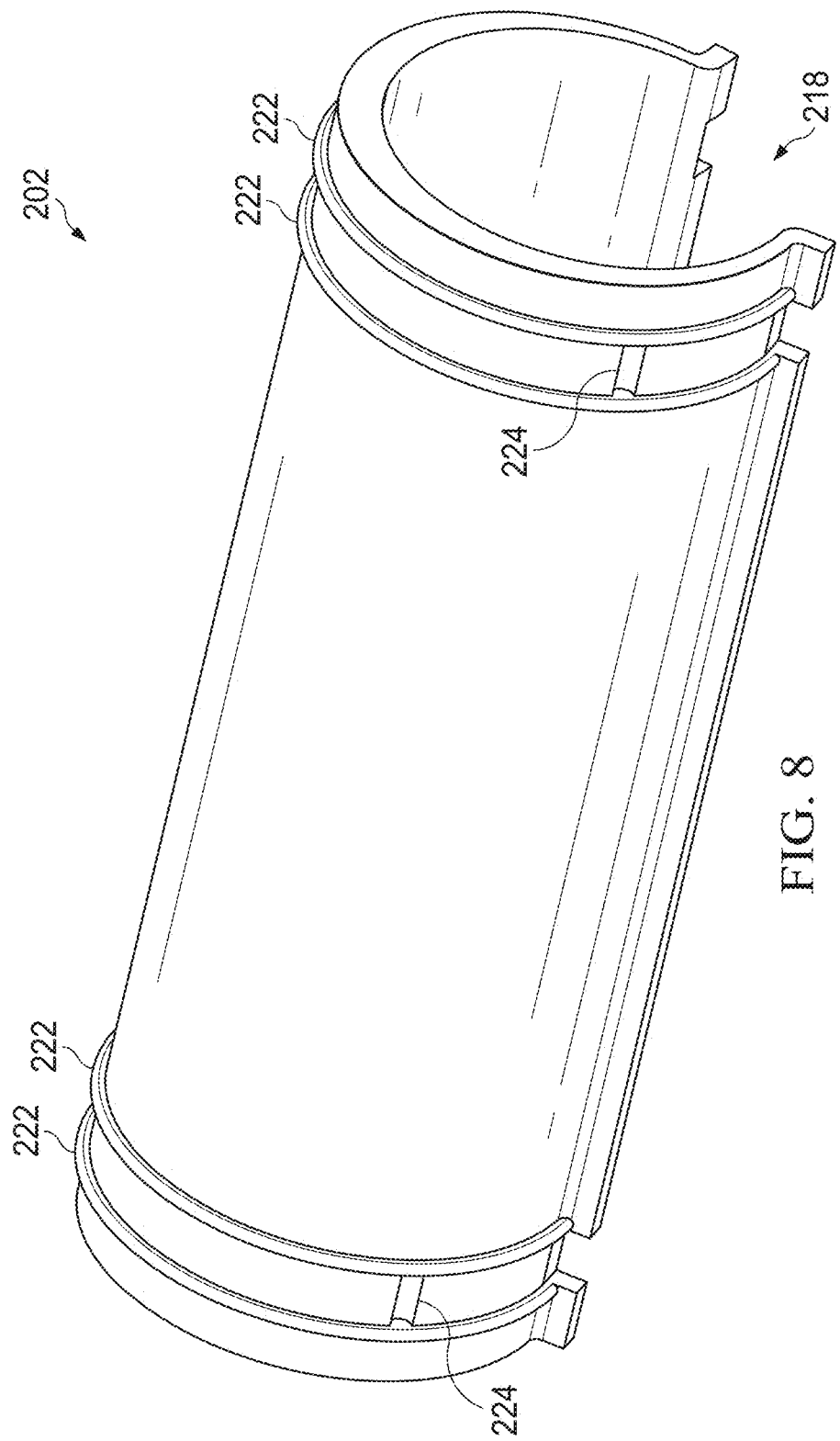
FIG. 8 is a perspective view of a coupling member of a feeder storage apparatus in accordance with this disclosure.

Referring specifically to FIGS. 7 and 8, the coupling member 202 is cylindrical in shape and includes a transverse opening 218 to allow a chicken producer to removably couple the coupling member 202 to the feed tube 106. In some embodiments, the coupling member 202 secures to the feed tube 106 by a friction fit. In other embodiments, the coupling member 202 has other shapes that at least partially encircle the feed tube 106 to secure the feeder storage apparatus 200 to the feed tube 106. In other embodiments, the coupling member 202 is secured to the feed tube 106 by other mechanisms, such as one or more fasteners (not shown).

Figure 9A:
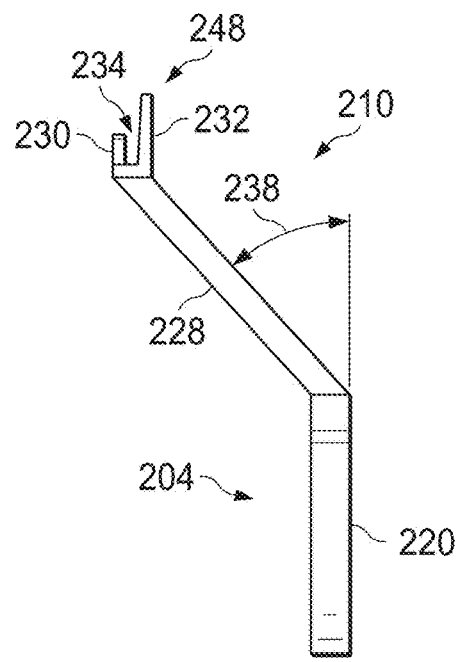
FIG. 9A is a side view of a body section and a feeder contacting section of a feeder storage apparatus in accordance with this disclosure.
Figure 9B:
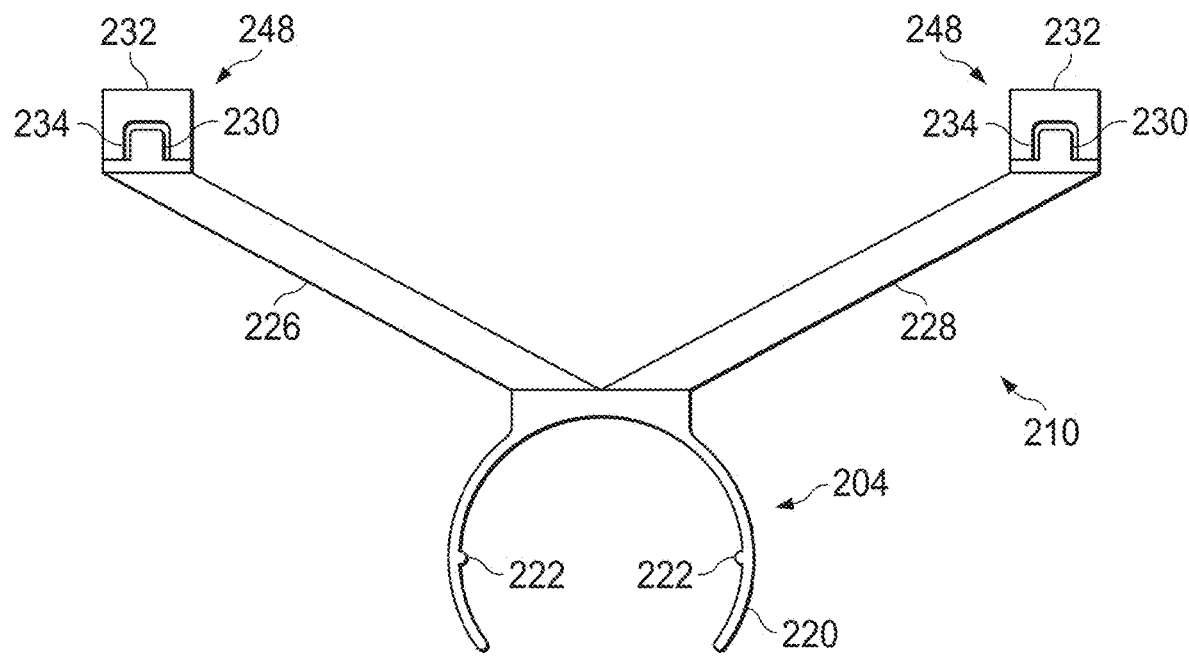
FIG. 9B is a front view of the body section and the feeder contacting section of FIG. 9A.

Referring now to FIGS. 7, 9A and 9B, the body section 204 is located between the feeder contacting section 210 and the coupling member 202 to space the feeder contacting section 210 a predetermined distance from the coupling member 202. In some embodiments, the body section 204 includes a coupling ring 220 that is coupleable to the coupling member 202 by at least partially surrounding the coupling member 202. Referring specifically to FIGS. 8 and 9B, in some embodiments the coupling ring 220 includes protrusions 222, such as ridges, that are configured to mate with indentations 224 (see FIG. 8) in the coupling member 202 to maintain a correct orientation of the coupling ring 220 on the coupling member 202. In some embodiments, the coupling member 202 includes protrusions 222, such as ridges, adjacent to the area to which coupling rings 220 attach. In some embodiments, the protrusions 222, such as ridges, maintain and otherwise secure the coupling ring 220 in a desired location on the coupling member 202.

Referring specifically to FIGS. 9A and 9B, in some embodiments the feeder contacting section 210 includes a first arm 226 and a second arm 228 that extended away from the coupling ring 220. In some embodiments, the first arm 226 and the second arm 228 each include a first finger 230 and second finger 232 at a first end 248 of the first arm 226 and the second arm 228 for coupling a feeder 208 to the first arm 226 and/or second arm 228, as shown in FIG. 7. Referring again to FIGS. 7, 9A and 9B, in some embodiments the first finger 230 is shorter than the second finger 232 to allow a chicken producer to easily align an edge 244 of the hopper 212 with a recess 234 formed between the first finger 230 and second finger 232. For example, in some embodiments the chicken producer places the edge 244 of the hopper 212 against the second finger 232 to guide the hopper 212 downward and into the recess 234 so that the edge moves between the first finger 230 and second finger 232. Referring specifically to FIG. 9A, in some embodiments the first arm 226 and second arm 228 extend at an angle 238 from the coupling ring 220. In other embodiments, the first arm 226 and second arm 228 extend vertically from the coupling ring 220.

Figure 10:
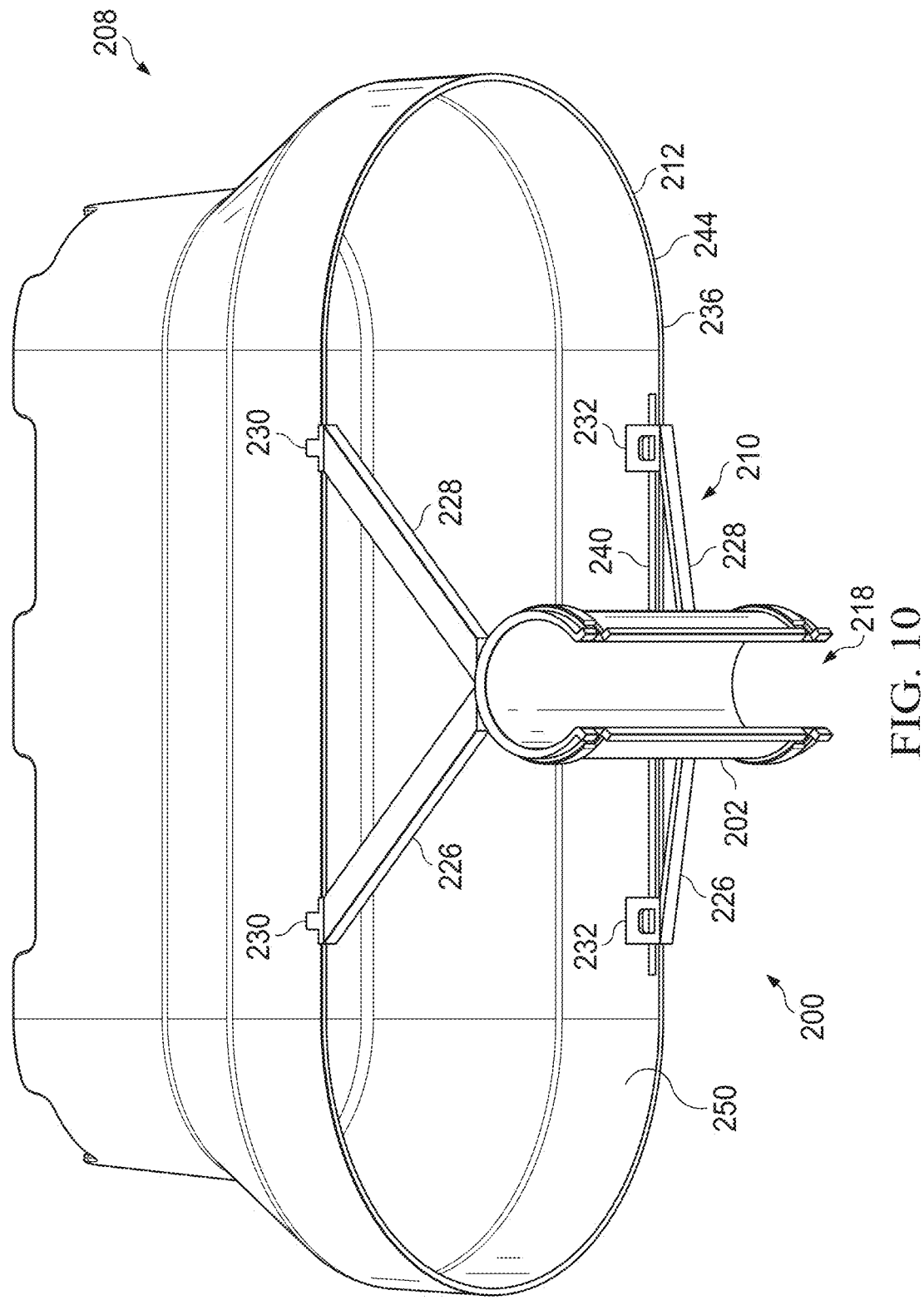
FIG. 10 is a bottom perspective view of an embodiment of a feeder storage apparatus with a feeder resting thereon in accordance with this disclosure.

Referring now to FIG. 10, in some embodiments the hopper 212 of the feeder 208 includes an elongated protrusion 240 on an interior surface 250 of the hopper 212 adjacent to the edge 244. In some embodiments, the second finger 232 of the first arm 226 and second arm 228 includes an indentation (not shown) to receive the elongated protrusion 240 to further secure the feeder 208 to the feeder storage apparatus 200.

Figure 11:
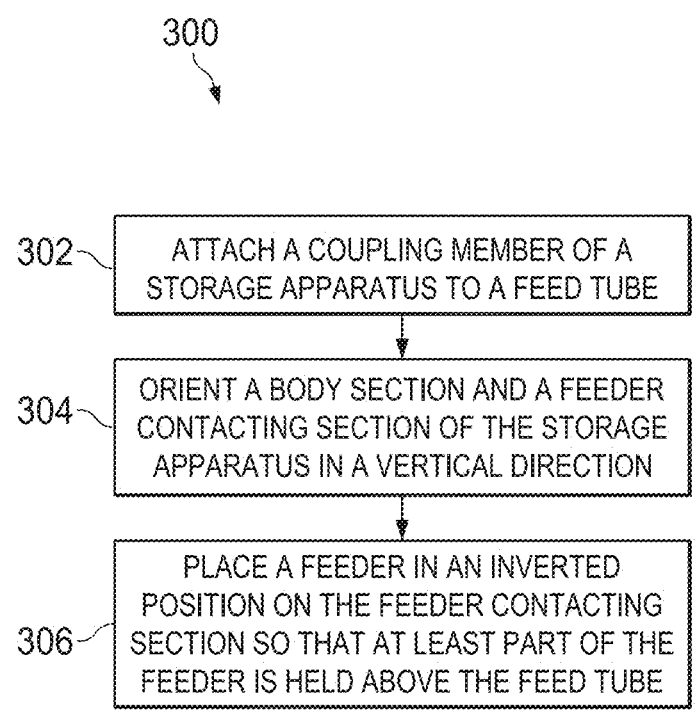
FIG. 11 is a schematic block diagram illustrating an embodiment of a method for storing a chicken feeder in accordance with this disclosure.

FIG. 11 illustrates an embodiment of a method 300 for conveniently storing a chicken feeder on a feeder storage apparatus 100 or 200. In some embodiments, the method 300 begins and the chicken producer removably secures a coupling member 104 or 202 of the feeder storage apparatus 100 or 200 to a feed tube 106, as shown at block 302. The chicken producer attaches the feeder storage apparatus 100 or 200 so that the body section 108 or 204 and the feeder contacting section 110 or 210 of the feeder storage apparatus 100 or 200 extends vertically from the feed tube 106, as shown at block 304. When the producer is ready to remove a chicken feeder 102 or 208 from the feeding area 114, the producer retrieves the chicken feeder 102 or 208 and places the chicken feeder 102 or 208 in an inverted orientation on the feeder contacting section 110 or 210 of the feeder storage apparatus 100 or 200, as shown at block 306. In some embodiments, at least a portion of the chicken feeder 102 or 208 is held above the feed tube 106 by the feeder storage apparatus 100 or 200. In some embodiments, such as the embodiments illustrated in FIGS. 1-6 and 12-14, the chicken producer places the chicken feeder 102 on the feeder storage apparatus 100 such that a bent arm 134 of the feeder contacting section 110 contacts a rib 138 of the hopper 136 of the chicken feeder 102 to hold the chicken feeder 102 on the feeder storage apparatus 100. In other embodiments, such as the embodiment illustrated in FIGS. 7-10, the chicken producer places an edge 244 of the hopper 212 within a recess 234 of the first arm 226 and the second arm 228 of the feeder storage apparatus 200 between a first finger 230 and a second finger 232. When the chicken producer desires to return the chicken feeder 102 or 208 to its position on the feeding area 114, the producer simply removes the chicken feeder 102 or 208 from the feeder contacting section 110 or 210 and places the chicken feeder 102 or 208 below a feed outlet 118 adjacent to the feeder storage apparatus 100 or 200.

The foregoing describes only some embodiments of the invention(s), and alterations, modifications, additions and/or changes can be made thereto without departing from the scope and spirit of the disclosed embodiments, the embodiments being illustrative and not restrictive. In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Furthermore, invention(s) have been described in connection with what are presently considered to be the most practical and preferred embodiments and it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A feeder storage apparatus for storing a chicken feeder on a chicken feed tube, comprising:
    a body section, the body section including:
        a laterally extending shelf on a first end of the body section, the shelf comprising a first distal shelf section and a second distal shelf section;
        a mounting web substructure on a first end of the body section for securing the body section to the chicken feed tube, the web substructure extending between the first distal shelf section and the second distal shelf section;
        a feeder contacting section on a second end of the body section, wherein the feeder contacting section includes at least one arm extending from the first end of the body section to support a feeder above the chicken feed tube and
    a coupling member secured to the mounting web structure, the coupling member including a first side portion and a second side portion, the first and second side portions, when secured together, forming a channel to receive the chicken feed tube to secure the body on the chicken feed tube.

2. The feeder storage apparatus according to claim 1, wherein the at least one of the first and second side portions further includes a tab extending therefrom for insertion into a corresponding slot on at the other a least one of the first and second side portions.

3. The feeder storage apparatus according to claim 1, wherein the web further includes a connecting aperture defined through and bounded by the mounting web of the mounting web substructure and configured to receive a fastener through the connecting aperture to secure the body section and the coupling member together.

4. The feeder storage apparatus according to claim 1, wherein the mounting web is integrally formed with the body section.

5. A feeder storage apparatus for storing a chicken feeder on a chicken feed tube, comprising:
    a body section comprising a laterally extending shelf comprising a first distal shelf section and a second distal shelf section;
    a mounting web substructure on a first end of the body section for securing the body section to the chicken feed tube and comprising a bar extending between a first distal shelf terminus of the first distal shelf section and a second distal shelf terminus of the second distal shelf section;
    a feeder contacting section on a second end of the body section, wherein the feeder contacting section includes at least one arm to support a feeder above the chicken feed tube,
    wherein the first distal shelf section is proximate to a first distal end of a bottom end of the body section and extends toward the second distal shelf section and terminates at the first distal shelf section terminus,
    wherein the second distal shelf section is proximate to a second distal end of the bottom end of the body section opposite the first distal end and extends toward the first distal shelf section and terminates at the first distal shelf section terminus,
    wherein a space between the first distal shelf section and the second distal shelf section is occupied by the mounting web substructure,
    wherein the mounting web further comprises:
        an inward web edge comprising a surface of the mounting web that is closest to the feeder contacting section of the feeder storage apparatus; and
        an outward web edge comprising a surface of the mounting web that is opposite the inward web edge and farthest from the feeder contacting section;
    the feeder storage apparatus further comprising a connecting aperture defined through and bounded by the mounting web of the mounting web substructure and configured to receive a fastener through the connecting aperture to maintain the body section and the chicken feed tube in mechanical communication,
    wherein the connecting aperture has a center spaced:
        an inward edge distance from the inward web edge,
        an outward edge distance from the outward web edge,
        a first distal shelf distance from the first distal shelf terminus, and
        a second distal shelf distance from the second distal shelf terminus,
    wherein the inward edge distance and the outward edge distance are equal, and
    wherein the first distal shelf distance and the second distal shelf distance are equal.

6. A feeder storage apparatus for storing a chicken feeder on a chicken feed tube, comprising:
    a body section comprising a laterally extending shelf comprising a first distal shelf section and a second distal shelf section;
    a mounting web substructure on a first end of the body section for securing the body section to the chicken feed tube and comprising a bar extending between a first distal shelf terminus of the first distal shelf section and a second distal shelf terminus of the second distal shelf section; and
    a feeder contacting section on a second end of the body section, wherein the feeder contacting section includes at least one arm to support a feeder above the chicken feed tube,
    wherein the body section includes a pair of support beams and one or more transverse beams extending between the support beams.

7. A feeder storage apparatus for storing a chicken feeder on a chicken feed tube, comprising:
    a body section comprising a laterally extending shelf comprising a first distal shelf section and a second distal shelf section;
    a mounting web substructure on a first end of the body section for securing the body section to the chicken feed tube and comprising a bar extending between a first distal shelf terminus of the first distal shelf section and a second distal shelf terminus of the second distal shelf section; and
    a feeder contacting section on a second end of the body section, wherein the feeder contacting section includes at least one arm to support a feeder above the chicken feed tube,
    wherein the at least one arm includes a pair of arms, the arms angled towards each other and wherein the feeder contacting section includes a bent arm extending between the pair of arms.

8. The feeder storage apparatus of claim 7, wherein the arms each include one or more fingers at a distal end of the arms.

\* \* \* \* \*